Dec. 11, 1928.

P. S. HARPER 1,694,978

VALVE

Filed Dec. 27, 1926

Inventor
Philip S. Harper
By Wilkinson Huxley Byron & Knight

Patented Dec. 11, 1928.

1,694,978

UNITED STATES PATENT OFFICE.

PHILIP S. HARPER, OF CHICAGO, ILLINOIS.

VALVE.

Application filed December 27, 1926. Serial No. 157,084.

My invention relates to plug valves or plug cocks of the type used for general service and has for its primary object the provision of a plug valve which is moved longitudinally at the same time a rotative force is applied thereto for the purpose of opening or closing the valve.

My invention consists of a plug cock and an operating head therefor which cooperates with the plug in said cock through the means of spiral surfaces formed on the lower end of the head and upper end of the plug whereby a torque on said head applies both a torque to said plug and a force along the direction of its axis, tending to relieve its seating pressure.

Another object of my invention is to provide a plug cock in which the plug is seated very tightly when in either open or closed position, or at any intermediate position, and at the same time a cock in which the plug seating pressure at the time the valve is turned is automaticaly relieved so that it will turn readily.

Another object of my invention is to provide a cock in which the plug is seated very tightly at any point intermediate full open or closed positions in which the plug may be positioned for operating purposes between the open and closed position.

These and other objects of my invention, will be more apparent from the drawings in which:—

Figure 1:
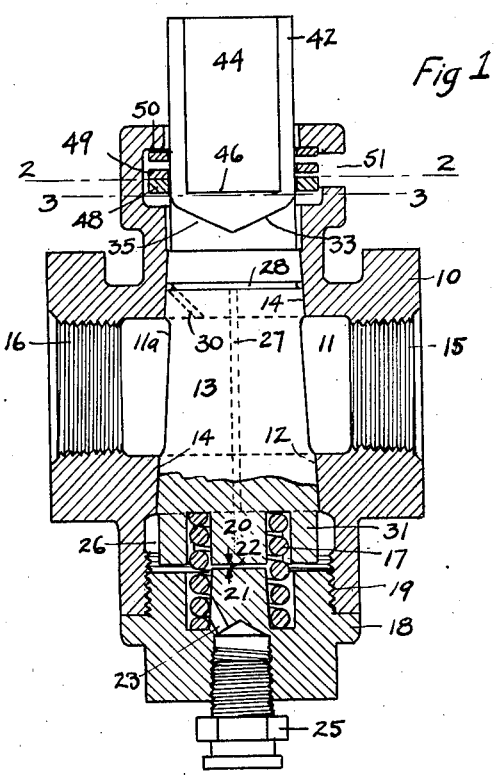
Figure 1 is a vertical cross section of a valve of the type of my invention.
Figure 2:
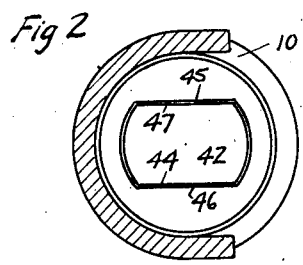
Figure 2 is a horizontal cross section along the line 2—2 in Figure 1, with the operating spring removed.
Figure 3:
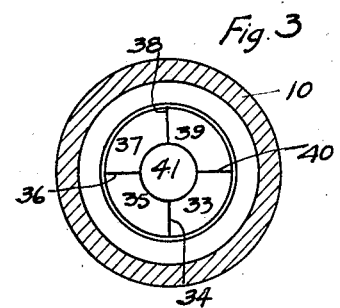
Figure 3 is a horizontal cross section along the line 3—3 in Figure 1, with the plug head removed.

Referring now to the drawings in which like figures refer to like parts throughout, 10 is a plug valve casing having a horizontal fluid passage 11 therein, and also having a vertical tapered passage 12 in which a plug 13 is seated and ground to a good bearing along the surface 14. The said plug has a transverse passage 11ª therethrough, said passage registering in one rotary position of the plug with the passage 11 in the casing 10. The casing 10 is internally threaded as at 15 and 16 at each of its ends for the connection of piping (not shown). The plug 13 is held seated in the said casing 10 by a coil spring 17 bearing on the under side of the said plug and held in compressed position by a cap 18, which is threaded into the casing at 19, the cap 18 also serving to close the lower end of the tapered passage 12. The plug 13 has a central projection 20 thereon entering the coil spring 17 and holding said spring in central position. A similar projection 21 in the cap 18 enters the bottom of the spring 17 and comes very close to the projection 20 on the plug, thereby functioning as a stop to prevent the plug becoming unseated any further than the very small distance 22 between said projections. The projection 21 on the cap 18 is tapered so as to be a tight fit in the spring at the bottom point whereas the projection 20 on the plug 13 is a loose fit in said spring. Consequently, on the turning of the plug 13 the spring 17 is stationary as regards the cap 18 and the casing 10, whereas the plug 13 rotates and bears on the spring 17 which is ground flat to form a good bearing thereon.

Means for lubrication is provided in accordance with my co-pending application Serial No. 506,506, filed October 8, 1921. A lubrication fitting 25 is supplied through which grease is forced into the chamber 26 through passage 23, thence up lubrication grooves 27 which are placed in the bearing surface in the casing 10, and these grooves extend from chamber 26 and into circular groove 28 in the bearing surface 14 of the plug 13. From said groove 28. a vent hole 30 connects to the fluid passage 11ª in said plug 13. Projections 31 are provided on said plug extending into lubricating chamber 26, said projections displacing the grease on rotation of the plug, since said grease otherwise would tend to be stationary due to being enclosed on three sides by stationary parts, the casing 10, spring 17 and cap 18. On displacement of the grease by the projections 31, it is brought into contact with the openings of the lubrication grooves 27 into the chamber 26, and any outflow from said chamber carries lubricating material onto the bearing surface 14 all as disclosed in said co-pending application.

The top surface 32 of the plug 13 has four spiral inclined planes formed thereon, the plane 33 sloping spirally downward in clockwise rotation to line 34 from which point spiral plane 35 slopes upward to line 36, then plane 37 slopes downward to line 38 from which point plane 39 slopes upward to line 40, where said plane 33 begins. All said planes are spirally placed around the cored depression 41. Seated on said planes 33, 35, 37 and 39, is a plug head 42 which has a surface of inclined spiral planes which mesh at all points and match with the said spiral inclined planes on the plug 13, except that the plug head does not bear in the center of the top surface of the plug 13 due to the cored depression 41 therein. Said plug head extends upward in round section and has flat surfaces 44 and 45 cut off of the upper part thereof for the proper adaptation of a suitable handle or wrench for applying a torque to said plug head. Where said flat portions begin, shoulders 46 and 47 are formed on which head washer 48 is seated. Said head washer carries circular flat bearing spring 49 which bears on the contracted portion 50 of the casing 10 and holds said parts in assembled relation. The slot 51 in the casing 10 is provided to permit assembly of said parts, since the head washer 48 and bearing spring 49 are of too large diameter to be assembled through the tapered passage 12. The spring 49 has very little tension and merely serves to take up any lost motion in the parts, and to maintain the plug head 42 seated against the spirally inclined top surface of the plug 13, so that said plug head, and consequently the handle (not shown) attached thereto, always maintain the same rotary position as regards the plug 13 when said valve is not being operated. On the other hand the coil spring 17 is made very large so as to seat the plug 13 with a much greater force than is usual in such valves, the reason for the use of this enlarged and stronger spring being apparent from the operation of the invention hereinafter to be described.

As to the operation and working of this invention and the purposes of the construction as disclosed, this valve is very much less liable to leakage than other plug valves, due to the heavy seating of the plug 13 by the enlarged spring 17; and also due to the fact that the valve is so constructed that the fluid pressure within the valve in the fluid pasages 11 and 11ª, the vent hole 30, grooves 27 and chamber 26, is effective on all parts of the plug except the upper surface which is exposed to atmospheric pressure through the slot 51 and through the clearance space around the plug head 42. Consequently with the usual high internal pressures the plug 13 is forced outward against its seat in the casing 10 and toward the surface where only the atmospheric pressure is effective. The force of the coil spring 17 alone is made so great that turning of the plug would be very difficult; and with the combined seating force of the fluid pressure in addition to the spring 17, turning of the plug is so hard as to be impossible in ordinary service. But in the valve of my invention the seating force is relieved automatically when it is desired to turn the valve in the following manner. When the plug head is turned with a suitable wrench (not shown), the plug 13 tends to remain stationary, due to the friction in the bearing surface 14 with the great seating pressure provided, and consequently the plug head advances on the spiral planes 33, 35, 27 and 39 and moves upward until the bearing spring 49 is totally compressed between the casing 50 and the head washer 48. The torque now applied to the head 42, since a solid bearing has been reached and the head can go upward no more, exerts a downward force against the plug 13 which is thereby relieved in its seating pressure just to the extent of the downward force of said head against the plug. The instant this seating pressure has been relieved sufficiently for the plug to readily turn, the torque already being applied against the spiral planes 33, 35, 37 and 39, will turn said plug, but when turning of the valve is discontinued and the torque is no longer applied to the plug head, the full seating force of both the fluid pressure and the spring 17 is again effective and seats the plug tightly, so reducing any leakage tendency to a minimum.

It is evident that the slope and radius of the spiral inclined planes 33, 35, 37 and 39 may be proportioned so that the entire seating force provided for the plug could be relieved by any given torque applied to the plug head, and therefore the valve could be designed to be turnable with a given torque or less applied to the handle of the valve, such a feature being very desirable in a valve of this type.

For the proper working of my invention in its preferred form, the plug must be seated with a considerable force even with no fluid pressure on the valve, as otherwise the plug would be forced off its seat by such a light torque that the normal plastic friction of the grease in the bearing surface 14 would prevent turning of the plug until said plug was forced entirely free from its seat. This is a condition that is ruinous in a plug valve since it allows dirt to get between the ground bearing surfaces. In a properly designed valve of my invention with a large coil spring as shown, the plug cannot be forced off its seat in normal operation. However, in case an obstruction in the valve passages 11 and 11ª prevents rotation of the plug 13, said plug would be forced from its seat, and on this account a stop is provided by the projections 20 and 21, so that the plug could be unseated only by the small distance 22. In some forms of my invention an adjustable stop may be provided in place of the fixed stop as shown, so that the possible distance the plug could be unseated might be reduced to a minimum.

The spiral planes as shown between the plug head and the plug should have an angle less than the angle of static friction between the head and the plug on these planes, so that the plug head and plug could not lock together at any position advanced on the planes and so maintain a reduced seating pressure of the plug after application of torque to the plug head had been discontinued. In the invention as disclosed, it is intended that the smallest upward angle of the spiral planes be greater than the angle of static friction between the parts, and in large valves where it is desirable to have a very small spiral angle roller or ball bearings may be used between the plug head and the plug, thus reducing the angle of friction very low and allowing a small spiral angle to be used.

The connection provided between the plug and the plug head may be made by means of other machine elements than the inclined planes as shown, it being only essential for the purpose of my invention that such machine elements entering into such connection, provide a differential connection whereby the difference in rotation between the plug head or handle and the plug causes an axial motion between said two parts.

While I have described more or less precisely the details of construction, I do not wish to be understood as limiting myself thereto, as I contemplate changes in form and the proportion of parts and the substitution of equivalents as circumstances may suggest or render expedient without departing from the spirit and scope of my invention.

I claim:

A valve casing with a fluid passage therethrough, a rotatable closing plug member intercepting said passage, said plug member having a tapered bearing in said casing, means seating said plug in said bearing, said plug having surfaces inclined to its rotary axis, a plug head engaging said plug on said inclined surfaces, and a spring acting between said casing and said plug head, maintaining said plug head in engagement with said inclined surfaces on said plug member, and tending to rotate said plug head in a given registry with said plug member.

Signed at Chicago, Illinois, this 20th day of December, 1926.

PHILIP S. HARPER.